United States Patent [19]

Breda

[11] Patent Number: 5,566,459
[45] Date of Patent: Oct. 22, 1996

[54] LASER BEAM EMITTING DEVICE TO BE USED AS LEVELS

[76] Inventor: Charles Breda, 5, rue de la Tour, 31150 Bruguieres, France

[21] Appl. No.: 160,250

[22] Filed: Dec. 2, 1993

[30] Foreign Application Priority Data

Dec. 3, 1992 [FR] France ................... 92 14789

[51] Int. Cl.⁶ ................................ G01C 5/00
[52] U.S. Cl. .................. 33/290; 33/299; 33/354; 33/DIG. 21
[58] Field of Search .................. 33/290, 291, 292, 33/299, 354, DIG. 21; 356/138; 359/402, 821, 800

[56] References Cited

U.S. PATENT DOCUMENTS

| 3,471,234 | 10/1969 | Studebaker | 356/138 |
| 4,544,236 | 10/1985 | Endo | 359/821 X |
| 5,121,220 | 6/1992 | Nakamoto | 359/821 X |

FOREIGN PATENT DOCUMENTS

| 8812362 | 3/1990 | France | 33/DIG. 21 |
| 5565921 | 5/1980 | Japan | 359/821 |

Primary Examiner—Thomas B. Will
Attorney, Agent, or Firm—Eric Fincham

[57] ABSTRACT

A laser beam device to perform sightings and tracings which makes use of a calibrated tube inside which resides a laser emitting component of which the optical emitting axis coincides with the mechanical axis of the tube, a mirror securely mounted at the end of the tube and set at a 45° angle from the incident laser beam, an end piece mounted and rotating on the end of the tube which includes a number of ports which can be brought to be coaxially centered in the reflected beam by simply rotating the end piece and a number of optical systems respectively mounted in the ports. The device provides flexibility without requiring additional set-up.

8 Claims, 1 Drawing Sheet

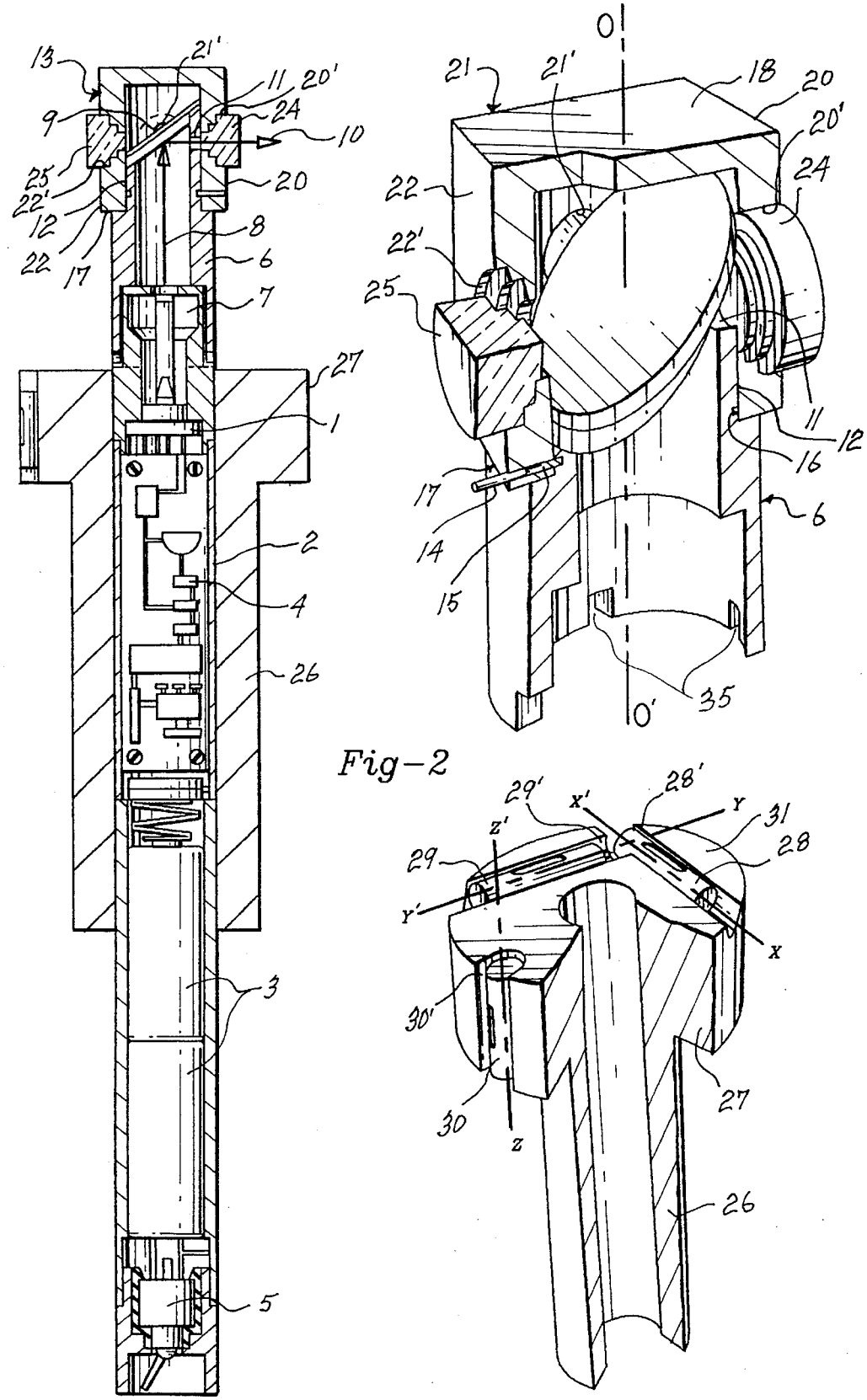

LASER BEAM EMITTING DEVICE TO BE USED AS LEVELS

BACKGROUND OF THE INVENTION

This invention relates to an improvement in a laser beam emitting device to be used as a level, particularly to perform sightings and tracings.

SUMMARY OF THE INVENTION

This invention specifically involves a device associating a laser emitter combined with a spirit level system including a calibrated tube inside which resides a solid-type laser emitting component of which the optical emitting axis coincides with the mechanical axis of the tube, means of reflecting the laser beam in a given direction to said axis, and, means of rotating the tube on said axis.

In such a device, described in U.S. copending application Ser. No. 093,554, filed Jul. 19, 1993, Inventor C. Breda now abandoned, and in Canadian Patent File No. 2,100,689 laid open Jan. 21, 1994, the emitting end of the tube is designed to ensure the collimation of the beam and to accept interchangeable end pieces bearing different optical systems such as, for example an end piece including a mirror set at a 45° angle which reflects the laser beam in a direction perpendicular to the axis of the tube, an end piece in order to form a light stroke or a series of light dots, or even an end piece in order to form both a light beam perpendicular to the axis of the tube and a light beam parallel to the axis of the tube thanks to a transelective blade.

Practically, it seems that in spite of the numerous benefits provided by the flexibility of switching end pieces, this solution has a significant drawback in that the switching of end pieces usually disturbs the device requiring it to be set again.

So because of the high accuracy level the device must reach, if it is to be used to perform level tracings or readings over relatively long distances (for example, 10 to 20 meters), these settings are delicate to perform with regard to the optical system as well as to the readjustment of the whole device.

It is therefore an object of the invention to eliminate this drawback.

For this purpose, there is provided a device of the aforesaid type characterized by the fact that it includes a mirror securely mounted at the end of the tube and set at a 45° angle from the incident laser beam in order to reflect a beam reflected perpendicular to the axis of the tube, an end piece mounted to rotate on the end of the tube, coaxially to the latter, this end piece being equipped with a number of ports set perpendicular to the tube in order to be brought to and coaxially centered in the reflected beam, by simply rotating the end piece, a number of optical systems mounted respectively into the ports and, preferably, factory-set.

It is obvious that with such a set-up, the operator wishing to switch from one optical system to another simply has to rotate the end piece, without worrying about settings.

As an added benefit, the rotating assembly of the end piece on the tube will be equipped with a notching system in order to show the operator the angular positions in which the optical systems are correctly centered on the laser beam reflected by the mirror.

Another drawback of the existing solutions previously described consists in the fact that the different levels used to ensure accurate orientation of the axis of the tube on the device are supported by various parts, which makes the settings more difficult to perform and requires the use of high accuracy articulations.

Therefore, the invention is also intended to solve this problem by combining all three levels which define a trirectangular trihedron, in a single support part of the tube of the device and which are simultaneously visible.

This support part may take the form of a cylindrical sleeve having a shoulder at one end, into which the tube fits in a secure manner. In this case, the front plane of the shoulder extending in a plane of a cross section includes two right angle grooves into which reside two respective spirit levels. As for the plane parallel to the cylindrical sleeve, there is an axial groove in the sleeve into which partially resides a third spirit level.

Having thus generally described the invention, reference will now be made to the accompanying drawings illustrating embodiments thereof, in which:

BRIEF DESCRIPTION OF THE DRAWINGS

FIG. 1 is an axial section of a laser beam emitting device according to the invention;

FIG. 2 is a schematic perspective of an axial section of a barrel-like end piece, which equips the emitting tube illustrated in FIG. 1;

FIG. 3 is a schematic perspective of partial sections, based on two planes at a 120° angle, of a tube support sleeve equipped with three levels oriented according to three perpendicular directions.

DETAILED DESCRIPTION OF THE INVENTION

As illustrated in FIG. 1, the laser emitting device includes a solid-type laser diode 1 emitting both visible and invisible light, as indicated by beam 8 for example in the 400–1,100 nm frequency range. This small diode 1 is mounted at one end of a metallic tube 2 which contains miniature batteries 3, for example, 1.5 V, connected to an electronic control circuit 4 which regulates the optical power of the diode 1.

A waterproof switch 5, sealed with resin into a housing located at one end of the tube 2, starts and stops the light emission.

The other end of the tube takes the shape of a tubular nose 6 containing a beam collimation optical assembly 7 with focus adjustment.

Furthermore, the nose 6 has, at the end, a mirror 9 set at a 45° angle from the axis of the tube 2 and consequently from the aforesaid beam 8, in order to obtain a reflected beam 10 at a 90° angle from the said axis.

This beam 10 is directed on a window 11 made in the wall of the nose 6 in order to flow outside the tube.

The outside wall of the nose 6 forms, near its end, a break followed by a cylindrical area forming a bearing 12 on which a rotating barrel-like end piece 13 is mounted.

In the example shown in FIG. 2, this end piece 13 is axially held on the nose with a radial pin 14 through a hole 15 drilled in the end piece 13 and engaging into a coaxial circular groove 16 formed in the bearing 12.

In this example, the end piece 13 has a cylindrical inside form approximately the size of the diameter of the bearing 12, and a parallelopipedal outside form including a front plane 17, a closed back plane 18 and four lateral planes 20, 21, 22, 23 which extend parallel to the axis 00' of the inside form.

The inside volume of the end piece emerges onto the front plane 17 to allow insertion of the bearing 12.

Each of the lateral planes 20, 21, 22, 23 includes a window 20', 21', 22', 23' located at port 11 level, and which is specifically designed to accept an optical system such as, for example:

- a holographic network 24 in order to obtain the projection of a series of aligned dots in one particular direction (for example, horizontally or vertically),
- a cylindrical lens 25 in order to obtain the projection of a stroke, vertically or horizontally,
- a diaphragm to subdue the power of laser radiation (for example, to meet standards).

Each optical system is preferably similar in structure and is cylindrical to permit rotation thereof in its window.

As an added benefit, a notching system can be provided between the nose 6 and the end piece 13 as shown by notches 35 (FIG. 2) to facilitate centering of windows 20', 21', 22', 23' in the axis of the reflected beam 10 (each notch corresponding to the centered position of a window).

It is quite clear that the features mentioned above support switching from one optical system to another by simply rotating the end piece 13, with no setting required, since all optical settings can be performed once and for all at the factory.

Obviously, optical systems to be mounted in windows 20', 21', 22', 23' are interchangeable In some cases, they can be mounted rotating on the axis defined by the reflected beam 10: this feature will be useful, e.g. to modify the orientation of a stroke or a series of dots to be projected.

In the example shown in FIG. 1, the metallic tube of the emitting device tightly engages in a tubular support sleeve 26. Its end is directed towards the head of the tube 2 and has a cylindrical shoulder 27 used to support three spirit levels 28, 29, 30 oriented respectively according to the three axis X'X-Y'Y-Z'Z of an orthonormal target.

To be more precise, the radial plane 31 of the shoulder 27 indicating the end of the tubular sleeve 26 has two right angle semi-circular grooves 28', 29' in which two spirit levels 28, 29 are respectively placed (X'X, Y'Y axis perpendicular to the longitudinal axis of the tube 2).

In addition, the cylindrical wall of the shoulder has a semi-circular axial groove 30' in which the third spirit level partially resides (Z', Z axis parallel to the longitudinal axis of the tube 2).

It is quite clear that with such a set-up, setting the tube 2 position and orientation is made significantly easier since the operator needs to focus on one area of the device only.

Such as described in the aforesaid application for patent, the tube 2 can be rotated on its axis manually as well as with a motor.

In this case, the support sleeve 26 can be rotated with the tube 2 or held in position in relation to the tube.

The benefit of this last solution is that the rotation of the tube 2 does not modify the status of levels 28, 29, 30.

What is claimed is:

1. A laser radiation beam emitting device, suitable for use as a level to perform sightings and tracings, the device having a calibrated tube inside of which resides a laser emitting component, for emitting a laser beam wherein an optical emitting axis coincides with the mechanical axis of the tube, means for reflecting the laser beam in a given direction to said axis and, means of rotating the tube on said axis, characterized by having:

said means for reflecting comprising a mirror securely mounted at an end of said tube and set at a 45° angle from the optical emitting axis in order to reflect the beam perpendicular to the axis of the tube, an end piece mounted to rotate on said end of said tube, coaxially to the latter, said end piece being equipped with a plurality of ports set perpendicular to said tube in order to be brought to and coaxially centered in said reflected beam by simply rotating the end piece, a plurality of optical systems mounted respectively into said ports.

2. A device as claimed in claim 1, including a notching system for indicating the angular positions of said end piece for which said optical systems are correctly centered on said laser beam reflected by said mirror.

3. A device as claimed in claim 2, wherein at least one of the optical systems is interchangeable.

4. A device as claimed in claim 2, wherein at least one of said optical systems is mounted in order to rotate on an axis defined by the reflected beam.

5. A device as claimed in claim 1, wherein at least one of said optical systems consists of a holographic network.

6. A device as claimed in claim 1, wherein at least one of said optical systems consists of one cylindrical lens.

7. A device as claimed in claim 1, wherein said tube is supported by a support having a first spirit level in an X axis, a second spirit level in a Y axis, and a third spirit level in a Z axis.

8. A device as claimed in claim 7, wherein said support has the form of a cylindrical sleeve, with a shoulder at one end, into which tightly engages said tube, a front plane of the shoulder extending in a plane of a cross section including two right angle grooves into which reside said first and second spirit levels, and an outer portion of the shoulder having an axial groove into which partially resides said third spirit level.

\* \* \* \* \*